United States Patent [19]

Saito

[11] Patent Number: 4,717,111

[45] Date of Patent: Jan. 5, 1988

[54] FLUID-FILLED RESILIENT ENGINE MOUNT

[75] Inventor: Siro Saito, Kani, Japan

[73] Assignee: Tokai Rubber Industries, Ltd., Aichi, Japan

[21] Appl. No.: 906,536

[22] Filed: Sep. 12, 1986

[51] Int. Cl.$^4$ ............................................. F16M 13/00
[52] U.S. Cl. .................................... 248/562; 248/659; 267/140.1
[58] Field of Search ............... 248/562, 636, 638, 659, 248/635; 180/73 TW, 300; 267/140.1, 140.2, 8 R, 152, 57.1 R

[56] References Cited

U.S. PATENT DOCUMENTS

| | | | |
|---|---|---|---|
| 3,642,268 | 2/1972 | Hipsher | 267/57.1 R |
| 3,698,703 | 10/1972 | Hipsher | 267/140.1 X |
| 4,032,202 | 6/1977 | Ishikawa | 267/57.1 R |
| 4,588,174 | 5/1986 | Konishi | 267/140.1 |
| 4,605,207 | 8/1986 | Konishi | 267/57.1 R |
| 4,630,806 | 12/1986 | Dan | 267/140.1 |

FOREIGN PATENT DOCUMENTS 125430  7/1985  Japan ............................ 267/57.1 R Primary Examiner—J. Franklin Foss
Attorney, Agent, or Firm—Parkhurst & Oliff

[57] ABSTRACT

A fluid-filled resilient engine mount including an inner and an outer sleeve which have axes parallel to each other, and a resilient member which is interposed between the inner and outer sleeves and which cooperate with the outer sleeve to define a plurality of fluid chambers which communicate with each other through at least one orifice. The engine mount further includes a stopper block of an elastic material positioned in a radially outer portion of each fluid chamber, and fixed relative to the outer sleeve and the resilient member. The stopper block has an abutting portion which protrudes in the corresponding fluid chamber toward the inner sleeve. The abutting portion is spaced from a bottom of the corresponding void, and is abuttable on the bottom, thereby preventing an excessive amount of elastic deformation of the resilient member.

14 Claims, 8 Drawing Figures

VEHICLE FRONT

FLUID-FILLED RESILIENT ENGINE MOUNT

BACKGROUND OF THE INVENTION

1. Field of the Invention

The present invention relates generally to a fluid-filled resilient engine mount of a bushing type for damping vibrations by utilizing elasticity of a resilient member and a viscous resistance of a fluid. More particularly, the invention is concerned with an engine mount of such type suitable for flexibly supporting a transverse engine of an FF automobile.

2. Discussion of the Related Art

Various types of resilient or elastic mounts have been proposed for elastically or flexibly supporting an engine of an automotive vehicle on its body. For supporting an engine of FF (front-engine front-drive) vehicles, engine mounts of a cylindrical bushing type have been increasingly used, for their comparatively excellent vibration damping characteristics. A typical example of such a bushing type uses a resilient member interposed between an inner sleeve and an outer sleeve. Since the damping capability of a resilient member itself is limited, various attempts have been recently made to use a fluid-filled resilient engine mount which utilizes a viscous resistance of a fluid flowing through an orifice, to provide a large damping effect for engine-idling and other low-frequency vibrations, and which is adapted to provide relatively low dynamic spring constant for high-frequency vibrations.

An example of such a fluid-filled resilient engine mount is known, which includes an inner sleeve, an outer sleeve located radially outwardly of the inner sleeve and having an axis parallel to an axis of the inner sleeve, and a generally annular resilient member interposed between the inner and outer sleeves. The resilient member has a plurality of voids which are spaced from each other in its circumferential direction and open in its outer surface. The outer sleeve closes the voids and thereby cooperates with the resilient member to define a plurality of fluid chambers filled with a fluid. These fluid chambers are held in communication with each other at least one orifice.

The engine mount of the type indicated above is capable of providing a desirable damping effect by means of a viscous resistance to flows of the fluid through the orifice or orifices. However, this type of engine mount has no satisfactory provisions for protecting the resilient member from an excessive amount of elastic deformation of the resilient member interposed between the inner and outer sleeves. Therefore, repeated radial movements of the inner and outer sleeves relative to each other upon applications of excessively large vibrational loads therebetween will cause the resilient member to have repeated radial elastic deformation in its radial direction, resulting in reducing the durability of the resilient member and consequently shortening its life expectancy. Further, the excessive deformation of the resilient member will deteriorate the fluid tightness of the fluid chambers, i.e., sealing between the outer sleeve and the opening of the voids in the resilient member.

SUMMARY OF THE INVENTION

It is accordingly an object of the present invention to provide a fluid-filled resilient engine mount which has improved stopper means for effectively protecting its resilient member from excessive elastic deformation in the radial direction.

Another object of the invention is the provision of such an improved fluid-filled resilient engine mount which has provisions for minimizing a shock that is produced upon activation of the stopper means.

A further object of the invention is the provision of such improved fluid-filled resilient engine mount which is easy and economical to assemble and manufacture.

According to the present invention, there is provided a fluid-filled resilient engine mount comprising an inner sleeve, an outer sleeve located radially outwardly of the inner sleeve and having an axis parallel to that of the inner sleeve, a generally annular resilient member, means for defining at least one orifice, and a stopper block. The generally annular resilient member is interposed between the inner and outer sleeves, and has a plurality of voids which are spaced from each other in a circumferential direction of the resilient member and which are open in an outer surface of the resilient member. The outer sleeve closes the voids and thereby cooperates with the resilient member to define a plurality of fluid chambers corresponding to the voids. The fluid chambers are filled with a fluid. The plurality of fluid chambers communicate with each other through the above-indicated at least one orifice. The stopper block of an elastic material is positioned adjacent to an opening of each of the plurality of voids and fixed relative to the outer sleeve and the resilient member. The stopper block has an abutting portion which protrudes in the corresponding fluid chamber toward the inner sleeve. The abutting portion is spaced from a bottom of the corresponding void, and is abuttable on the bottom, thereby preventing an excessive amount of elastic deformation of the resilient member.

In the fluid-filled resilient member constructed according to the principle of the invention as described above, the abutting portion of the stopper block is adapted to abut on the bottom of the appropriate one of the voids, when an excessively large radial vibrational load is applied between the inner and outer sleeves. Hence, the stopper block is capable of preventing an excessive amount of relative radial displacement between the inner and outer sleeves, and thereby avoiding an excessive amount of radial elastic deformation of the resilient member interposed between the inner and outer sleeves. Since the stopper block is made of an elastic material, a shock to be produced upon abutment of the abutting portion against the bottom of the void will be effectively minimized. Furthermore, the present engine mount is easy to assemble, since the stopper block is not an integral part of the outer sleeve, i.e., a member separate from the outer sleeve, which is suitably positioned and fixed relative to the outer sleeve.

According to one feature of the invention, the stopper block has an arcuate outer surface in pressed contact with an inner surface of the outer sleeve.

According another feature of the invention, the stopper block has a pair of end faces at opposite ends of the arcuate outer surface, and the resilient member has a pair of seats formed adjacent to opposite edges of the opening of each void which are parallel to the axis of the inner sleeve. The pair of end faces of the stopper block are held in contact with the seats of the resilient member.

According to a further feature of the invention, the plurality of fluid chambers consist of two fluid chambers which are disposed symmetrically with each other with respect to the inner sleeve.

In accordance with a still further feature of the invention, the engine mount further comprises a rigid member fitted on the outer surface of the resilient member. The rigid member has a plurality of apertures aligned with the plurality of voids in the resilient member. In this case, the outer sleeve is fitted on an outer surface of the rigid member, thereby holding the resilient member via the rigid member.

According to a yet further feature of the invention, the means for defining at least one orifice constitutes at least a part of the bottom of each void. Each of the at least one orifice is open in a portion of the part of the bottom of each void, which portion is free of abutment of the abutting portion of the stopper block.

In one form of the above feature of the invention, the means for defining at least one orifice consists of a thick-walled portion of the inner sleeve.

In an alternative form of the same feature of the invention, the means for defining at least one orifice consists of a metallic orifice block press-fitted on the outer surface of the inner sleeve. The orifice block has a plurality of surfaces each of which includes a portion on which the abutting portion of the stopper block is abuttable, and another portion in which the at least one orifice is open. This another portion is free of abutment of the abutting portion. In the case where the plurality of fluid chambers consist of two fluid chambers, the stopper block may be adapted to have a generally rectangular shape, and a central bore engaging the outer surface of a substantially axially middle portion of the inner sleeve. The stopper block may have a pair of opposite generally flat surfaces exposed to the two fluid chambers. The generally flat surfaces cooperate with a radially inner portion of the resilient member to form the bottom of each void.

According to another feature of the invention, the plurality of fluid chambers consist of two fluid chambers, and the means for defining at least one orifice has two orifices each of which communicates with the two fluid chambers.

BRIEF DESCRIPTION OF THE DRAWINGS

The above and other objects of the invention will be better understood by reading the following description of a preferred embodiment of the invention, when considered in conjunction with the accompanying drawings, in which.

DETAILED DESCRIPTION OF THE PREFERRED EMBODIMENT

To further clarify the principles of the present invention, the preferred embodiment of the invention will now be described in detail, by reference to the accompanying drawings.

Figure 1:
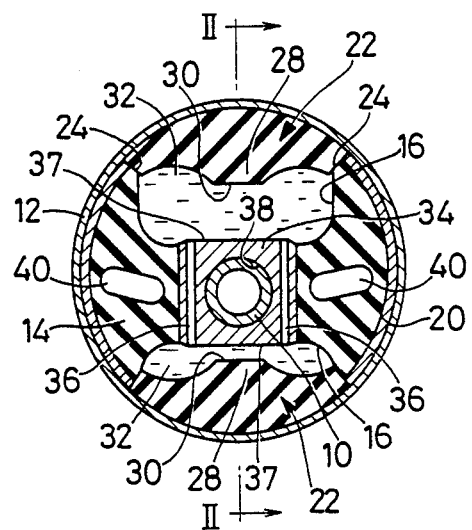
FIG. 1 is an elevational view in transverse cross section of one embodiment of a fluid-filled resilient engine mount of the present invention.
Figure 2:
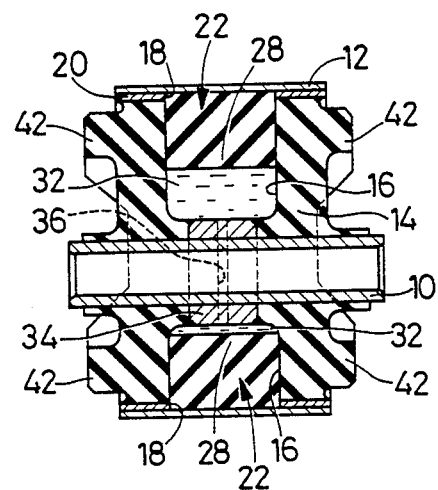
FIG. 2 is an elevational view in longitudinal cross section of the engine mount of FIG. 1, taken alone line II—II of FIG. 1.

Referring first to FIGS. 1 and 2, there is shown a fluid-filled resilient engine mount which includes an inner sleeve 10 made of a metal. An outer sleeve 12 which is also made of a metal is disposed radially outwardly of the inner sleeve 10, such that the axes of the two sleeves 10, 12 are parallel to each other. Between these inner and outer sleeves 10, 12, there is interposed a resilient member in the form of a generally annular rubber member 14. The inner sleeve 10 and the rubber member 14 supporting the inner sleeve 10 are constructed such that the inner sleeve 10 is eccentric with respect to the outer sleeve 12 (offset from the axis of the outer sleeve 12) when the engine mount is not in use or when no load is applied to the engine mount, but is substantially concentric with the axis of the outer sleeve 12 when the engine mount is installed in place or when a static load of an engine of a vehicle is applied to the engine mount (between the inner and outer sleeves 10, 12).

Figure 3:
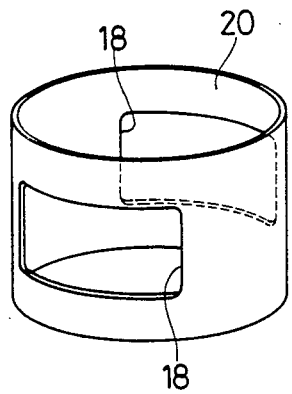
FIG. 3 is a perspective view of a rigid member of the engine mount of FIGS. 1 and 2.

The rubber member 14 has two voids 16, 16 which are formed opposite to each other, diametrically of the inner sleeve 10. These voids 16, 16 are open in the outer surface of the rubber member 14, and have a suitable depth in the radial direction of the rubber member 14. As shown in FIG. 2, the voids 16, 16 are formed in an axially middle portion of the rubber member 14, with suitable dimensions in the axial and circumferential directions of the rubber member 14. The rubber member 14 is secured at its inner surface to the outer surface of the inner sleeve 10, and at its outer surface to a generally cylindrical rigid member 20, by means of vulcanization during molding of the rubber member in a mold. As depicted in FIG. 3, the rigid member 20 has a pair of windows or apertures 18, 18 at its circumferential positions corresponding to the circumferential positions of the voids 16, 16 of the rubber member 14. The outer sleeve 12 is fitted on the outer surface of the rigid member 20, as indicated in FIGS. 1 and 2.

Figure 4:
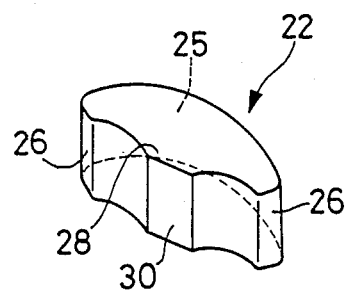
FIG. 4 is a perspective view of a stopper block incorporated in the engine mount of FIGS. 1 and 2.

Each of the two voids 16, 16 formed in the rubber member 14 has a radially outer portion aligned with corresponding aperture 18 of the rigid member 20. This radially outer portion of each void 16 is filled with a stopper block 22 as shown in FIG. 4. In other words, the stopper block 22 is positioned adjacent to an opening of the corresponding void 16. The stopper block 22 is an elastic member which is made of a suitable rubber material and has a generally arcuate elongate shape. The stopper block 22 has an arcuate outer surface 25 which has a circumferential length substantially equal to the circumferential dimension of the corresponding void 16 as measured at its opening adjacent to the aperture 18 of the rigid member 20, in the circumferential direction of the rubber member 14. The opposite longitudinal ends of the arcuate outer surface 25 of the stopper block 22 terminate in a pair of inclined end faces 26 which extend in the axial direction of the inner sleeve 10. These inclined end faces 26, 26 are formed so as to constitute the end portions of the opposite sides of a sector whose circular arc is defined by the arcuate outer surface 25. In the meantime, the rubber member 14 has a pair of inclined seats 24, 24 which are formed along the opposite edges of the opening of each void 16 which are parallel to the axis of the inner sleeve 10. These seats 24, 24 have an angle of inclination which is complementary with that of the inclined end faces 26, 26 of the stopper block 22. As most clearly shown in FIG. 1, each stopper block 22 is positioned within the radially outer portion of the corresponding void 16, such that the inclined end faces 26, 26 are seated on the corresponding inclined seats 24, 24 of the rubber member 14, and such that the arcuate outer surface 25 is held in pressed contact with the inner surface of the outer sleeve 12. The outer sleeve 12 is radially inwardly compressed against the rigid member 20.

Each of the two stopper blocks 22 has an abutting portion in the form of an upraised portion 28 remote from the arcuate outer surface 25. The upraised portion 28 protrudes in the void 16 toward the inner sleeve 10, and has a radially innermost surface in the form of a generally flat stopper surface 30 which is spaced by a predetermined distance from and parallel to the bottom of the corresponding void 16. As indicated in FIG. 2, the opposite side surfaces of each stopper block 22 are held in contact with the opposite inner surfaces of the corresponding void 16 which are perpendicular to the axis of the rubber member 14. Thus, the position of the stopper blocks 22 is fixed in the axial direction of the rubber member 14. When an excessive radial displacement takes place between the inner and outer sleeves 10, 12, the stopper surface 30 of the appropriate stopper block 22 abuts on the bottom of the corresponding void 16, thereby functioning to limit an amount of elastic deformation of the rubber member 14.

As described above, the stopper blocks 22 close the voids 16, 16, and cooperate with the rubber member 14 to define a pair of fluid chambers 32, 32 which are located at diametrically opposite portions of the rubber member 14, and are symmetrical with each other with respect to the inner sleeve 10. While the stopper blocks 22 contribute to maintaining fluid tightness of the fluid chambers 32, 32 to some extent, complete fluid tightness of the fluid chambers 32, 32 is provided by means of fluid tightness between the outer surface of the rigid member 20 and the inner surface of the outer sleeve 12 in pressed contact with the rigid member 20. The thus formed fluid chambers 32, 32 are filled with a suitable incompressible fluid such as alkylene grycols, polyalkylene gricols, silicone oils, or low molecular weight polymers, or a mixture thereof. The term "fluid" used herein is broadly interpreted to also mean a fluid substance having a high viscosity. Although the stopper blocks 22 cooperate with the rubber member 14 to define the fluid chambers 32, 32, it is possible to consider that the stopper blocks 22, 22 are disposed within the fluid chambers 32, 32 which are defined by the rubber member 14 and the outer sleeve 12.

The two fluid chambers 32, 32 are held in communication with each other through two orifices 36, 36 formed in a metallic orifice block 34 which has a generally rectangular shape as shown in FIGS. 1 and 2. The orifice block 34 has a central bore 38 (FIG. 1) which engages the outer surface of an axially middle portion of the inner sleeve 10, as indicated in FIG. 2. The orifice block 34 is press-fitted on the inner sleeve 10 and thereby secured thereto. The two orifices 36, 36 are formed linearly parallel to each other through relatively thick-walled portions of the orifice block 34 on opposite sides of the inner sleeve 10 (through the left and right side portions of the block 34 as seen in FIG. 1).

The radially inner portion of the generally annular rubber member 14 is secured by vulcanization to the opposite side surfaces of the orifice block 34 which are parallel to the orifices 36, 36, as indicated in FIG. 1. The orifice block 34 has opposite flat surfaces 37, 37 which are exposed to the respective fluid chambers 32, 32. These exposed flat surfaces 37, 37 cooperate with the radially inner portion of the rubber member 14 to form the bottoms of the voids 16, 16 or fluid chambers 32, 32. The two orifices 36, 36 are open in suitable portions of the flat surfaces 37, 37, which are not covered by the stopper surfaces 30, 30 of the stopper blocks 22, 22, when the stopper surfaces 30, 30 abut on the flat surfaces 37, 37. The diameter of the orifices 36, 36 is so selected that the orifices provide a predetermined viscous resistance to a flow of the fluid therethrough from one of the chambers 36, 36 to the other, and thereby damping a vibrational energy input to the engine mount.

Figure 8:
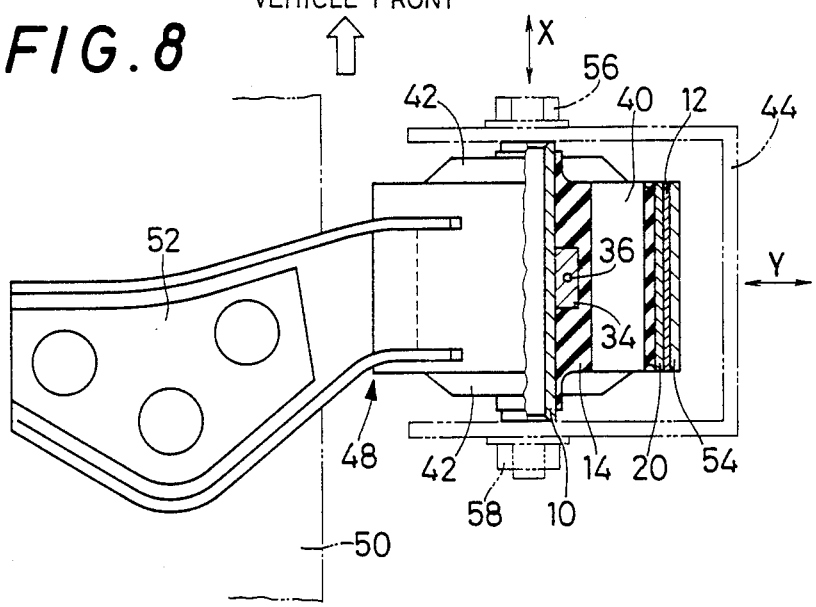

The rubber member 14 has a pair of through-holes 40, 40 formed in the respective circumferential portions between the two voids 16, 16. These through-holes 40, 40 extend parallel to the inner sleeve 10, and have a generally rectangular transverse cross sectional shape as seen in FIG. 1. The through-holes 40, 40 serve to soften the spring characteristics of the rubber member 14, primarily in the radial direction, and thereby contribute to determining the spring rate or constant of the rubber member 14. As shown in FIG. 2, the rubber member 14 has a pair of arcuate axial stopper portions 42, 42 which protrude from the opposite axial end faces in the axial direction. These stopper portions 42, 42 are formed in spaced-apart relation with each other in the circumferential direction of the rubber member 14. The stopper portions 42, 42 are adapted to abut on the inner surfaces of a U-shaped mounting bracket 44 to which the present engine mount is attached, as shown in FIG. 8. The abutment of the stopper portions 42 on the bracket 44 will prevent an excessive amount of axial displacement between the inner and outer sleeves 10, 12, thus protecting the rubber member 14 from an excessive axial shear stress.

For the purpose of illustration only, there will be described the procedure for assembling the present engine mount constructed as discussed above.

Figure 5:
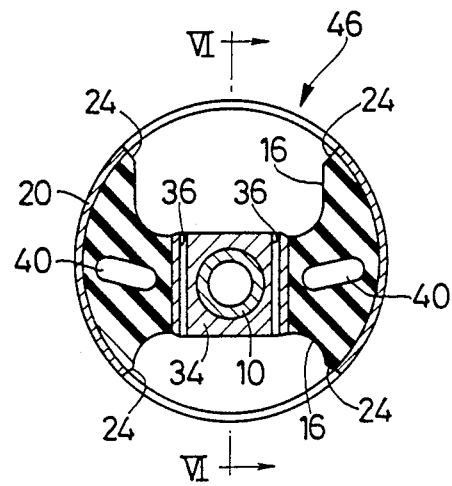
FIG. 5 is a transverse cross sectional view of a sub-assembly obtained during an assembling procedure of the engine mount of FIGS. 1 and 2.
Figure 6:
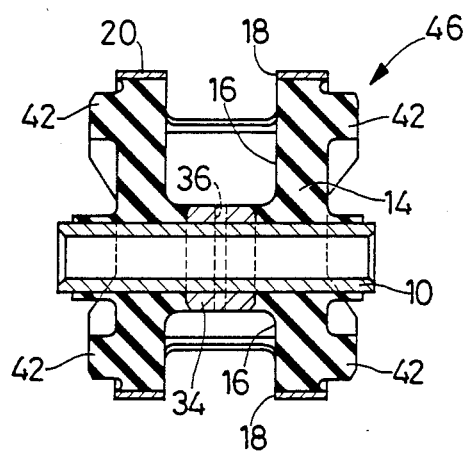
FIG. 6 is a cross sectional view taken along line VI—VI of FIG. 5.

Initially, the orifice block 34 is press-fitted on an axially middle portion of the inner sleeve 10. The inner sleeve 10 with the orifice block 34, and the rigid member 20 of FIG. 3 are positioned in a mold, such that the axes of these two members 10, 20 are parallel to each other, but offset from each other by a suitable distance. An unvulcanized rubber material is poured into the mold, to form the rubber member 14 secured by vulcanization to the inner sleeve 10, orifice block 34 and rigid member 20. Thus, a sub-assembly 46 of FIGS. 5 and 6 is obtained. In the meantime, the stopper blocks 22 shown in FIG. 4 are formed of a suitabale rubber material.

The sub-assembly 46 is placed in a bath of the fluid referred to above, and the stopper blocks 22 are positioned in the radially outer portions of the voids 16, 16 adjacent to the apertures 18, 18 of the rigid member 20, as indicated in FIG. 1. Then, the outer sleeve 12 is fitted on the sub-assembly 46 with the stopper blocks 22 incorporated therein. Subsequently, the outer sleeve 12 is subjected to a suitable drawing operation, so as to radially inwardly compress the outer sleeve 12 against the outer surface of the rigid member 20 for increasing the fluid tightness therebetween, and so as to press the stopper blocks 22 for pressed contact of the inclined end faces 26, 26 against the corresponding inclined seats 24, 24 of the rubber member 14. The thus formed fluid chambers 32, 32 are charged with the fluid in the bath. In this way, the engine mount of FIGS. 1 and 2 is prepared.

The present engine mount can be comparatively easily assembled, since the stopper blocks 22 are separate from the outer sleeve 12 and can be readily positioned within the sub-assembly 46 before the outer sleeve 12 is fitted on the sub-assembly 46 and radially compressed against the rigid member 20.

Figure 7:
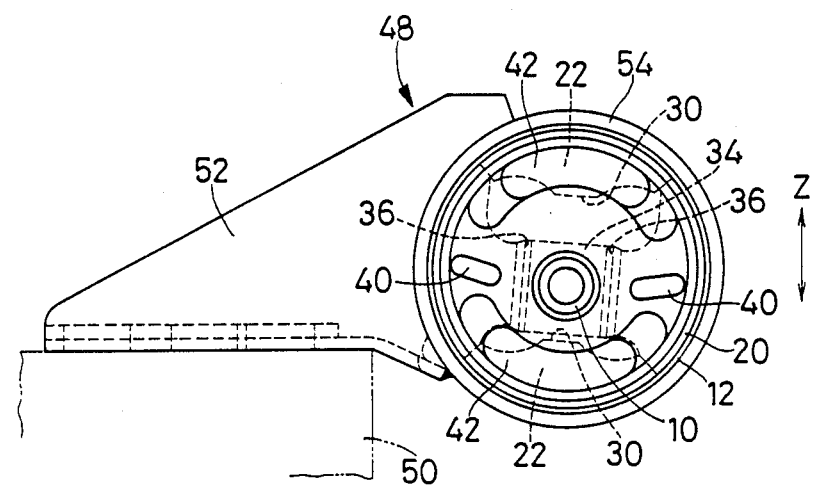
FIGS. 7 and 8 are an elevational view and a partially cutaway plan view, respectively, illustrating an example of application of the engine mount of FIGS. 1 and 2.

The thus produced fluid-filled resilient engine mount can be suitable used for flexibly or elastically suspending a transversal engine on a FF (front engine front drive) vehicle. For example, the outer sleeve 12 of the engine mount is secured to a bracket 48 for supporting an engine 50, while the inner sleeve 10 is secured to the previously indicated U-shaped bracket 44 fixed to the body of the vehicle, as shown in FIGS. 7 and 8. However, the engine mount can be used for supporting a transmission unit, a differential gear, and other members of the vehicle, as well as the engine.

The bracket 48 includes an arm portion 52 fixed to the engine 50, and a cylindrical portion 54 fixed to the arm portion 52. The cylindrical portion 54 engages the outer surface of the outer sleeve 12. The engine mount is positioned such that the axis of the inner sleeve 10 is parallel to the X direction of the vehicle (front-rear direction) or perpendicular to the Y direction (left-right direction), while the two fluid chambers 32, 32 are oriented vis-a-vis in the Z direction (vertical direction). The inner sleeve 10 is attached to the bracket 44 by a bolt 56 inserted through the inner sleeve 10, and a nut 56.

The thus installed engine mount cooperates with other engine mounts (not shown) of the same construction according to the invention, to support the engine 50 such that the inner and outer sleeves 10, 12 of each engine mount are substantially concentric with each other. Low-frequency vibrations such as engine-idling vibrations applied to the engine 50 in its primary vibrating direction (Z direction) are effectively damped by means of a viscous resistance of the fluid flowing through the orifices from one of the two orifices 32, 32 toward the other. Further, high-frequency vibrations of the engine can be absorbed by the rubber member 14 which has a relatively low dynamic spring constant.

In the event a relatively large vibrational load in the Z direction, for example, a severe vibrational shock due to running of the vehicle on a bumpy road surface is applied to the engine mount, a large relative displacement takes place between the inner and outer sleeves 10, 12. In this case, the stopper surface 30 of the appropriate stopper block 22 abuts on the corresponding flat surface 37 of the orifice block 34 at the bottom of the fluid chambers 32, 32, and prevents a further displacement between the inner and outer sleeves 10, 12, thus avoiding an excessive amount of elastic deformation of the rubber member 14. Accordingly, the durability of the rubber member 14 is increased. Further, the stopper blocks 22 serve to prevent otherwise possible separation of the rubber member 14 at it portions near the openings of the voids 16, 16, from the inner surface of the rigid member 20, thereby maintaining fluid tightness between the rubber member 14 and the rigid member 20 for a prolonged period of time.

Since the stopper blocks 22 are made of an elastic rubber material, a shock that is produced upon abutment of the stopper surfaces 30 against the flat surfaces 37 of the orifice block 34 is suitably reduced, and the rise of the spring constant of the engine mount is mitigated. As the abutting surfaces 30 and 37 of the stopper blocks 22 and the metallic orifice block 34 are both flat, desirable stopping characteristics may be obtained. Further, the present stopper arrangement using a rubber material for one of the abutting surfaces (stopper surfaces 30) and a metallic material for the other abutting surface (flat surfaces 37), is advantageous in preventing a large relative displacement between the inner and outer sleeves, over an arrangement which uses a rubber material for both of the abutting surfaces.

While the metallic orifice block 34 press-fitted on the inner sleeve 10 serves as means for defining the orifices 36, 36 in the illustrated embodiment, it is possible to form the inner sleeve 10 with a larger wall thickness at least at its axially middle portion, and form at least one orifice through the thick-walled middle portion of the inner sleeve. In this case, a portion of the inner sleeve 10 serves as means for defining an orifice.

It will be understood that the invention may be embodied with various other changes, modifications and improvements which may occur to those skilled in the art. For example, the stopper blocks 22 may be modified in their configuration and manner of positioning with respect to the associated members.

I claim

1. A fluid-filled resilient engine mount comprising:
an inner sleeve;
an outer sleeve located radially outwardly of said inner sleeve and having an axis parallel to that of said inner sleeve;
a generally annular resilient member interposed between said inner and outer sleeves, said resilient member having a plurality of voids which are spaced from each other in a circumferential direction of said resilient member and are open in an outer surface of said resilient member, said outer sleeve closing said voids and thereby cooperating with said resilient member to define a plurality of fluid chambers corresponding to said voids, said fluid chambers being filled with a fluid;
means for defining at least one orifice through which said plurality of fluid chambers communicate with each other;
a stopper block of an elastic material positioned adjacent to an opening of each of said plurality of voids and fixed relative to said outer sleeve and said resilient member, said stopper block having an abutting portion which protrudes in the corresponding fluid chamber toward said inner sleeve, said abutting portion being spaced from a bottom of the corresponding void, and abuttable on said bottom, thereby preventing an excessive amount of elastic deformation of said resilient member; and
a rigid member fitted on the outer surface of said resilient member, said rigid member having a plurality of apertures aligned with said plurality of voids in said resilient member, said outer sleeve being fitted on an outer surface of said rigid member, thereby holding said resilient member via said rigid member.

2. A fluid-filled resilient engine mount according to claim 1, wherein said stopper block has an arcuate outer surface in pressed contact with an inner surface of said outer sleeve.

3. A fluid-filled resilient engine mount according to claim 2, wherein said stopper block has a pair of end faces at opposite ends of said arcuate outer surface, and said resilient member has a pair of seats formed adjacent to opposite edges of said opening of said each void which are parallel to the axis of said inner sleeve, said pair of end faces of said stopper block being held in contact with said seats of said resilient member.

4. A fluid-filled resilient engine mount comprising:
an inner sleeve;
an outer sleeve located radially outwardly of said inner sleeve and having an axis parallel to that of said inner sleeve;
a generally annular resilient member interposed between said inner and outer sleeves, said resilient member having a plurality of voids which are spaced from each other in a circumferential direction of said resilient member and are open in an outer surface of said resilient member, said outer sleeve closing said voids and thereby cooperating with said resilient member to define a plurality of fluid chambers corresponding to said voids, said fluid chambers being filled with a fluid;
a metallic orifice block press-fitted on the outer surfaces of said inner sleeve, and having at least one orifice through which said plurality of fluid chambers communicate with each other; and
a stopper block of an elastic material positioned adjacent to an opening of each of said plurality of voids and fixed relative to said outer sleeve and said resilient member, said stopper block having an abutting portion which protrudes in the corresponding fluid chamber toward said orifice block, said abutting portion being spaced from said orifice block;
said metallic orifice block having a plurality of surfaces each of which includes a portion on which said abutting portion of said stopper block is abuttable to thereby prevent an excessive amount of elastic deformation of said resilient member, and another portion in which said at least one orifice is open, said another portion being free of abutment of said abutting portion.

5. A fluid-filled resilient engine mount according to claim 4, wherein said stopper block has an arcuate outer surface in pressed contact with an inner surface of said outer sleeve.

6. A fluid-filled resilient engine mount according to claim 5, wherein said stopper block has a pair of end faces at opposite ends of said arcuate outer surface, and said resilient member has a pair of seats formed adjacent to opposite edges of said opening of said each void which are parallel to the axis of said inner sleeve, said pair of end faces of said stopper block being held in contact with said pair of seats of said resilient member.

7. A fluid-filled resilient engine mount comprising:
an inner sleeve;
an outer sleeve located radially outwardly of said inner sleeve and having an axis parallel to that of said inner sleeve;
a generally annular resilient member interposed between said inner and outer sleeves, said resilient member having a plurality of voids which are spaced from each other in a circumferential direction of said resilient member and are open in an outer surface of said resilient member, said resilient member further having a pair of seats formed adjacent to opposite edges of an opening of each of said voids which are parallel to the axis of said inner sleeve, said outer sleeve closing said voids;
a metallic member fitted on the outer surface of said inner sleeve, and cooperating with said outer sleeve and said resilient member to define a plurality of fluid chambers corresponding to said voids, such that said metallic member defines a bottom of each of said fluid chambers, said fluid chambers being filled with a fluid;
means for defining at least one orifice through which said plurality of fluid chambers communicate with each other; and
a stopper block of an elastic material positioned adjacent to said opening of each said void, said stopper block having an arcuate outer surface in pressed contact with an inner surface of said outer sleeve, and a pair of end faces at opposite ends of said arcuate outer surface, said pair of end faces being held in contact with said pair of seats of said resilient member, said stopper block further having an abutting portion which protrudes in the corresponding fluid chamber toward said inner sleeve, said abutting portion being spaced from said metallic member, and abuttable on said metallic member, thereby preventing an excessive amount of elastic deformation of said resilient member. deformation said resilient member.

8. A fluid-filled resilient engine mount according to claim 7, wherein said plurality of fluid chambers consist of two fluid chambers which are disposed symmetrically with each other with respect to said inner sleeve.

9. A fluid-filled resilient engine mount according to claim 7, further comprising a rigid member fitted on the outer surface of said resilient member, said rigid member having a plurality of apertures aligned with said plurality of voids in said resilient member, said outer sleeve being fitted on an outer surface of said rigid member, thereby holding said resilient member via said rigid member.

10. A fluid-filled resilient engine mount according to claim 7, wherein said means for defining at least one orifice constitutes at least a part of said bottom of said each void, each of said at least one orifice being open in a portion of said part of the bottom of said each void, which portion is free of abutment of said abutting portion of said stopper block.

11. A fluid-filled resilient engine mount according to claim 10, wherein said means for defining at least one orifice consists of a thick-walled portion of said inner sleeve.

12. A fluid-filled resilient engine mount according to claim 10, wherein said means for defining at least one orifice consists of a metallic orifice block press-fitted on the outer surface of said inner sleeve, said orifice block having a plurality of surfaces each of which includes a portion on which said abutting portion of said stopper block is abuttable, and another portion in which said at least one orifice is open, said another portion being free of abutment of said abutting portion.

13. A fluid-filled resilient engine mount according to claim 12, wherein said plurality of fluid chambers consist of two fluid chambers, and said orifice block has a central bore engaging the outer surface of a substantially axially middle portion of said inner sleeve, said orifice block having a generally rectangular shape and a pair of opposite generally flat surfaces exposed to said two fluid chambers, said generally flat surfaces cooperating with a radially inner portion of said resilient member to form said bottom of said each void.

14. A fluid-filled resilient engine mount according to claim 7, wherein said plurality of fluid chambers consist of two fluid chambers, and said means for defining at least one orifice has two orifices each of which communicates with said two fluid chambers.

* * * * *